United States Patent [19]

Engle, III

[11] 4,447,495

[45] May 8, 1984

[54] ADHESIVE PROCESS

[75] Inventor: Edward J. Engle, III, Wilmington, Del.

[73] Assignee: Hercules, Incorporated, Wilmington, Del.

[21] Appl. No.: 473,292

[22] Filed: Mar. 8, 1983

[51] Int. Cl.$^3$ .................... B32B 17/10; B32B 5/16
[52] U.S. Cl. .................... 428/429; 260/349; 427/387; 428/324; 428/363; 428/404; 428/405; 428/406; 428/407; 428/426; 428/446; 428/447; 428/391; 523/208; 523/209; 523/212; 523/213
[58] Field of Search ............... 428/447, 405, 391, 404, 428/406, 407, 426, 446, 429, 363, 324, 325; 427/387; 523/208, 209, 212, 213; 260/349

[56] References Cited

U.S. PATENT DOCUMENTS

| | | | |
|---|---|---|---|
| 3,585,103 | 6/1971 | Thomson | 428/429 |
| 3,706,592 | 12/1972 | Thomson | 117/72 |
| 3,944,574 | 3/1976 | Marsden | 428/429 |
| 3,983,265 | 9/1976 | Letoffe | 428/429 |
| 4,038,456 | 7/1977 | Marsden | 428/429 |
| 4,055,701 | 10/1977 | Marsden | 428/405 |

*Primary Examiner*—Ellis P. Robinson
*Attorney, Agent, or Firm*—Marion C. Staves; Jeffrey F. Craft

[57] ABSTRACT

In an improved adhesive process the amount of azidosilane coupling agent necessary to adhere a siliceous material to a polymer is reduced. The siliceous material, the azidosilane coupling agent and the polymer are admixed with an organosilicon compound and then heated at a temperature and for a time sufficient to decompose the azide groups of the azidosilane coupling agent. The reduction in the amount of azidosilane coupling agent is accomplished without adversely affecting the adhesion of the polymer to the siliceous material. Also disclosed are the products thus produced.

10 Claims, No Drawings

ADHESIVE PROCESS

BACKGROUND OF THE INVENTION

1. Field of the Invention

This invention relates to a process employing an azidosilane coupling agent and an organosilicon compound to promote the adhesion of polymers to siliceous materials. In particular, it relates to a process whereby the amount of azidosilane coupling agent is reduced and the coupling agent is replaced with an organosilicon compound without adversely affecting the adhesion of the polymer to the siliceous material. The invention also relates to the products so produced.

2. Description of the Prior Art

It is known in the art to coat siliceous materials such as glass and mica with polymers. It is further known that the adhesion of this coating can be improved by using an azidosilane coupling agent. However, such coupling agents are expensive.

SUMMARY OF THE INVENTION

It has now been found that the amount of coupling agent can be reduced and the coupling agent replaced with a less expensive organosilicon compound without sacrificing the adhesion of a polymer to a siliceous material.

A polymer can be adhered to a siliceous material by admixing the siliceous material, the azidosilane coupling agent, the polymer and an organosilicon compound having the formula:

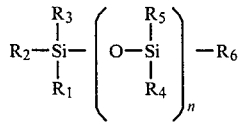

where n is an integer from 0 to 4 and $R_1$, $R_2$, $R_3$, $R_4$, $R_5$, and $R_6$, which may be the same or different, are selected from the group consisting of lower alkyl, aralkyl, or lower alkoxides and then heating the admixture at a temperature and for a time sufficient to decompose the azide groups.

DETAILED DESCRIPTION OF THE PREFERRED EMBODIMENTS

In an improved process, the adhesion between a polymer and a siliceous material is promoted by employing a combination of azidosilane coupling agent and an organosilicon compound. Many systems which employ azidosilane coupling agents to bond polymers to siliceous materials are known in the art. All of these systems are benefitted by the disclosed process. The polymers which can be bonded to siliceous materials include polyolefins, polyesters and polyamides.

Exemplary polymers are the hydrocarbon polymers including saturated, unsaturated, linear, atactic, crystalline or nonlinear amorphous polymers, copolymers, terpolymers, etc. as for example polyethylene, polypropylene, poly(4-methylpentene-1), polybutene-1, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc. and blends of these polymers with each other. In addition, nonhydrocarbon polymers including the cellulose esters such as cellulose acetate butyrate, cellulose acetate, cellulose partial alkyl ethers such as hydroxyethyl and hydroxypropyl cellulose; polyesters such as poly(ethylene terphthalate); drying and nondrying alkyd resins, etc.; poly(alkylene oxides) such as poly(ethylene oxide) and poly(propylene oxide), etc.; poly(arylene oxides) such as poly(phenylene oxide), etc.; the polyamides such as nylon, perlon-L, aromatic polyamides, etc.; and poly(vinyl alkyl ethers) such as poly(vinyl methyl ether) etc.; vinyl chloride polymers containing at least 10 mole percent of vinyl chloride such as poly(vinyl chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl acetal copolymers such as the vinyl chloride-vinyl butyral copolymers, vinyl chloride-vinylidene chloride-acrylonitrile terpolymers, vinyl chloride-vinyl acetate-maleic anhydride terpolymers etc.; chlorinated natural rubber; ethylene-vinyl acetate copolymers; poly(vinylidene chloride); vinylidene chloride-acrylonitrile copolymers; poly(ethyl acrylate); poly(ethyl methacrylate); polysulfone; epoxy resins; poly[3,3-bis(chloromethyl) oxetane]; polychloroprene; butadiene-acrylonitrile copolymers: butadiene-acrylonitrile-styrene terpolymers; etc. can be bonded to the above-mentioned materials.

Any siliceous material may be bound to the polymer. Typical siliceous materials include mica, glass, talc, Wollastonite, asbestos, sand, clay, cement, stone, brick and ceramic materials.

Azidosilane coupling agents used to adhere the siliceous material to the polymer are known in the art and include sulfonylazide, azidoformate, and diazido substituted silanes. Generally, they have the formula:

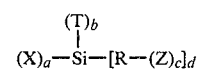

where R is an organic radical, X is selected from halo, hydroxy, alkoxy, aryloxy, organo oxycarbonyl, azido, amine, and amide radicals; T is selected from alkyl, cycloalkyl, aryl, alkaryl, and aralkyl radicals; a is an integer from 1 to 3; b is an integer from 0 to 2; c is an integer from 1 to 10; d is an integer from 1 to 3; and a+b+d equals 4; and Z is selected from

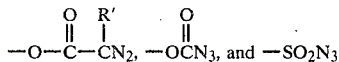

where R' is selected from hydrogen, alkyl, cycloalkyl, aryl and —COOR" radicals; where R" is selected from alkyl, cycloalkyl, and aryl radicals. Generally, R will be selected from the group consisting of the hydrocarbon, halo-substituted hydrocarbon, hydrocarbon-oxy-hydrocarbon, hydrocarbon-thiohydrocarbon and hydrocarbon-sulfonyl-hydrocarbon divalent radicals. In preferred embodiments R will be a divalent organic radical selected from the group consisting of alkylene radicals such as the straight and branched $C_1$–$C_{20}$ alkylene radicals which include, for instance, the methylene, ethylene, trimethylene, tetramethylene, pentamethylene, hexamethylene, octamethylene, decamethylene, docecamethylene, octadecamethylene, etc. radicals; cycloalkylene radicals such as the $C_3$–$C_{20}$ cycloalkylene radicals which include, for instance, the cyclohexylene, cyclopentylene, cyclooctylene, cyclobutylene, etc. radicals; arylene radicals such as o-, m-, and p-phenylene, naphthylene, biphenylene, etc. radicals; arylene-dialkylene radicals, such as o-, m-, and p-xylylene diethylene, o-, m-, and p-phenylene diethylene, etc. radicals; alkylene-diarylene radicals such as methylene bis (o-, m- and p-phenylene), ethylene bis(o-, m-, and p-phenylene), etc. radicals; cycloalkylene-dialkylene radicals such as, 1,2-, 1,3- and 1,4-cyclohexane-dimethylene, 1,2- and 1-3-cyclopentane dimethylene, etc. radicals; and the alkylene-oxy-alkylene radicals, arylene-oxy-arylene radicals, alkarylene-oxy-arylene radicals, alkarylene-oxy-alkarylene radicals, aralkylene-oxy-alkylene radicals, aralkylene-oxy-aralkylene radicals, etc. as well as the corresponding thio and sulfonyl radicals, specific examples of which include ethylene-oxy-ethylene, propylene-oxy-butylene, phenylene-oxy-phenylene, methylenephenylene-oxy-phenylene-methylene, phenylene-methylene-oxy-methylenephenylene, ethylene-thio-ethylene, phenylene-thio-phenylene, phylene-methylene-thio-methylenephenylene, butylene-sulfonyl-butylene, etc. radicals. It will, of course, be obvious to those skilled in the art that R can contain other functional groups, which are substantially inert to the reactions in which these compounds are used, such as esters, sulfonate esters, amides, sulfonamides, urethanes, and the like. In general R' can be hydrogen, alkyl, cycloalkyl, aryl or —COOR" radicals. The most preferred alkyl, cycloalkyl and aryl radicals are methyl, ethyl, propyl, butyl, isobutyl, cyclohexyl, cycloheptyl, phenyl, tolyl, etc. The radical R" can be alkyl, cycloalkyl, or aryl with the most preferred radicals being methyl, ethyl, propyl, butyl, isobutyl, cyclohexyl, cycloheptyl, phenyl, tolyl, etc. In general X can be hydroxy or any hydrolyzable radical. Typical hydrolyzable radicals are the halo radicals which include, for instance, the fluoro, chloro, bromo and iodo radicals; the alkoxy radicals including the $C_1$-$C_{20}$ straight and branched chain alkoxy radicals such as methoxy, ethoxy, propoxy, butoxy, isobutoxy, octadecyloxy, etc.; the aryloxy radicals such as phenoxy, etc.; the organo oxycarbonyl radicals including the aliphatic oxycarbonyl radicals such as acetoxy, propionyloxy, stearoyloxy, etc.; the cycloaliphatic oxycarbonyl radicals such as cyclohexylcarbonyloxy, etc.; the aromatic oxycarbonyl radicals such as benzoyloxy, xylyloxy, etc.; the azido radical; the amine radical; the substituted amine radicals such as ethylamine, diethylamine, propylamine, etc.; and the amide radicals such as formamide, acetamide, trifluoro-acetamide, benzamide, etc. Generally T will be a radical selected from the group consisting of alkyl, cycloalkyl, aryl, alkaryl, and aralkyl radicals such as methyl, ethyl, propyl, isopropyl, butyl, hexyl, cyclohexyl, cycloheptyl, phenyl, tolyl, benzyl, xylyl, etc.

Typical azidosilane coupling agents are 3-(trimethoxysilyl)propyl diazoacetate,
2-(methyldichlorosilyl)ethyl diazoacetate,
p-(trimethoxysilyl)benzyl diazoacetate,
10-[(3-trimethoxysilylpropyl)carbamoyl]decyl diazoacetate,
4-(trimethoxysilyl)butyl α-diazopropionate
3-(ethyldimethoxysilyl)propyl α-diazo-α-phenylacetate,
3-(trichlorosilyl)propyl α-diazo-α-carbomethoxyacetate,
2-(trimethoxysilyl)ethyl α-diazo-α-carbophenoxyacetate,
4-(ethoxydichlorosilyl)cyclohexyl diazoacetate,
3-(trimethoxysilyl)propyl azidoformate,
3-(methyldimethoxysilyl)propyl azidoformate,
2-chloro-3-[3-(trimethoxysilyl)propoxy]propyl azidoformate,
3-(triazidosilyl)propyl azidoformate,
2-(trimethoxysilyl)ethyl azidoformate,
3-(triacetoxysilyl)propyl azidoformate,
2-[3-(trimethoxysilyl)propoxy]ethyl azidoformate,
3-(methyldiacetosilyl)propyl azidoformate,
2-(ethyldipropionyloxysilyl)ethyl azidoformate.
p-(trimethoxysilyl)phenyl azidoformate,
4-(diethoxychlorosilyl)butyl azidoformate,
4-(ethyldimethoxysilyl)cyclohexyl azidoformate,
3-(phenyldichlorosilyl)propyl azidoformate,
4-(trisdimethylaminosilyl)butyl azidoformate,
5(trimethoxysilyl)amylsulfonylazide,
4-(trimethoxysilyl)cyclohexylsulfonylazide,
2-methyl-4-(trichlorosilyl)butylsulfonylazide,
3-chloro-6-(trimethoxysilyl)hexylsulfonylazide,
6-(trimethoxysilyl)hexylsulfonylazide,
2-(trichlorosilyl)ethylsulfonylazide,
3-(dimethylaminodimethylsilyl)propylsulfonylazide,
2-(triethoxysilyl)ethylsulfonylazide,
3-(methyldimethoxysilyl)-propylsulfonylazide,
3-trimethoxysilyl)propylsulfonylazide,
4-[diethoxy-(4-sulfonylazidobutyl)silyl]butylsulfonylazide,
p-(trimethoxysilyl)benzenesulfonylazide
2-(trimethoxysilyl)ethylbenzenesulfonylazide,
N-3-(triethoxysilyl)propyl-N'-3-azidosulfonylpropylurea,
N-3-(triethoxysilyl)propyl-N'-m-azidosulfonylphenyl The organosilicon compounds used to partially replace the coupling agent have the general formula

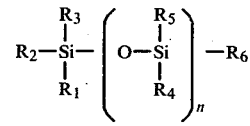

where n is an integer from 0 to 4 and where $R_1$, $R_2$, $R_3$, $R_4$, $R_5$ and $R_6$ are lower alkyl, aralkyl, or lower alkoxides and may all be the same or may differ from one another.

Typical lower alkyls include, methyl, ethyl, propyl, butyl, pentyl, hexyl, heptyl, octyl, while typical aralkyls include benzyl, tolyl, and ethylbenzyl and typical alkoxides include methoxy, ethoxy, propoxy, butoxy, pentoxy, hexoxy and heptoxy. Representative organosilicon compounds include ethyl silicate, propyl silicate, octyl triethoxysilane, tetrakis(2-ethylhexoxy)silane, tetrabutoxysilane, trimethoxysilyl ethylbenzene, hexamethyldisiloxane, octamethyltrisiloxane.

Ethyl silicate(tetraethoxysilane) and n-propylsilicate (tetra-n-propoxy silane) are preferred compounds.

The process can be carried out in many ways, because the order of admixing the components is not critical. For example, the azidosilane coupling agent and the organosilicon compound may be premixed to form a solution or emulsion. This mixture can then be applied to either the siliceous material alone, or to the polymer alone, or to a combination of both polymer and siliceous material. Furthermore, it is not necessary that the azidosilane coupling agent and the organosilicon compound be premixed. It is possible to first apply the azidosilane coupling agent or to first apply the organosilicon compound to either the siliceous material or to the polymer or to a combination of both. It is important, however, that at some time after the polymer, the azidosilane coupling agent and the organosilicon compound have been combined, the combination is heated at a temperature and for a time sufficient to cause decomposition of the coupling agent's azide groups. The temperature at which decomposition is effected can be varied over a wide range depending on the specific azidosilane coupling agent employed. In general, however, the temperature is in the range of from about 120° C. to about 250° C. The time required which depends on the particular components chosen is readily determinable by one skilled in the art. Generally it will be from about one second to about ten minutes.

The amounts of azidosilane coupling agent and organosilicon compound used vary depending upon the specific ones chosen, the surface area of the siliceous material, and the polymer to be bonded to the material. The amounts to be used in a particular situation will be readily determinable by one skilled in the art. In general, the amount of azidosilane coupling agent employed will be from about 0.025 to about 1.0%, preferably from 0.05 to about 0.3% based on the weight of the siliceous material. The amount of organosilicon compound employed will be from about 1 to about 5 times the weight of the azidosilane coupling agent employed.

Typically, the azidosilane coupling agent and the organosilicon compound, whether applied singly or together are applied in the form of a solution which is sprayed, brushed, or poured over the surface of the material to be treated. Alternatively, the material to be treated is dipped into a solution or emulsion containing the azidosilane or the organosilicon compound or both. Typical solvents for the azidosilane coupling agent and the organosilicon compound include methylene chloride, ethylene dichloride, trichloroethylene, perchloroethylene, methanol, ethanol, isopropyl alcohol, acetone, methyl ethyl ketone, benzene and toluene.

The following examples are to further illustrate the invention and not to limit it. All parts and percentages are by weight of the siliceous material unless otherwise clearly indicated.

EXAMPLES 1–4

100 gram samples of mica are suspended in methylene chloride and to these slurries are added from 0 to 0.5 weight percent of 2-(trimethoxysilyl)ethylbenzenesulfonylazide (hereinafter referred to as TMSEBA), and from 0 to 1 weight percent of ethyl silicate. The amount of azidosilane coupling agent and organosilicon compound employed in each example is listed in Table 1. After standing 15 minutes, the solvent is stripped under reduced pressure (15 torr.) and the residues kept at 50°-55° C. for 15-20 minutes. In each example, the coated mica is placed in a pan and allowed to dry in air at room temperature overnight.

In each example the coated mica is dry blended with polypropylene flake at the 40 weight percent level. The blend is then compression molded at 240° C. for ten minutes under 10 tons pressure followed by five minutes cooling in order to form 6"×3"×⅛" plaques. The plaques are then cut and their edges machined into 1"×3"×⅛" test pieces. The procedures given in ASTM D790 are followed to determine the flexural strength and modulus of the test pieces which are reported in Table 1.

TABLE 1

| Example | Mica g. | TMSEBA g. | TMSEBA % | Ethyl Silicate g. | TMSEBA/ Ethyl Silicate | Flexural Strength psi | Modulus psi |
|---|---|---|---|---|---|---|---|
| 1 | 100 | — | — | — | — | 6300 | 900,000 |
| 2 | 100 | 0.50 | 0.50 | — | — | 9400 | 900,000 |
| 3 | 100 | 0.25 | 0.25 | 0.75 | 1:3 | 9800 | 1,100,000 |
| 4 | 100 | 0.33 | 0.33 | 0.68 | 1:2 | 9100 | 1,110,000 |

EXAMPLES 5–7

Mica/polypropylene compression molded samples are prepared as described in Examples 1-4 except that 1-(triethoxysilyl)hexylsulfonylazide (hereinafter referred to as TEHSA) is the coupling agent employed and the organosilicon compound used is tetra-n-propyl silicate (hereinafter referred to as TPS). The amounts used and the properties of the compression molded samples are shown in Table 2.

TABLE 2

| Example | % TEHSA | % TPS | Flexural Strength (psi) | Modulus (psi) |
|---|---|---|---|---|
| 5 | 0.5 | — | 6991 | 1,000,000 |
| 6 | 0.25 | 0.25 | 8024 | 1,200,000 |
| 7 | 0.33 | 0.67 | 7594 | 1,100,000 |

EXAMPLES 8–11

In Examples 8-11 the procedure outlined for Examples 1-4 is modified by varying the order of the addition of the components. All other steps are the same. In Examples 8-10, first the ethyl silicate is added to the slurry of mice and methylene chloride. Then, after 15 minutes, the TMSEBA is added. In Example 11, first the ethyl silicate is added and then the methylene chloride was stripped off. The mica was reslurried and the TMSEBA was added. The amount of the components used and properties of the compression molded samples are shown in Table 3.

TABLE 3

| Example | Mica g. | TMSEBA g. | TMSEBA % | Ethyl Silicate g. | TMSEBA/ Ethyl Silicate | Flexural Strength psi | Modulus psi |
|---|---|---|---|---|---|---|---|
| 8 | 100 | 0.50 | 0.50 | 0.50 | 1:1 | 8300 | 940,000 |
| 9 | 100 | 0.25 | 0.25 | 0.75 | 1:3 | 8600 | 940,000 |
| 10 | 100 | 0.13 | 0.13 | 0.87 | 1:6.7 | 7400 | 970,000 |

TABLE 3-continued

| Example | Mica g. | TMSEBA g. | TMSEBA % | Ethyl Silicate g. | TMSEBA/ Ethyl Silicate | Flexural Strength psi | Modulus psi |
|---|---|---|---|---|---|---|---|
| 11 | 100 | 0.25 | 0.25 | 0.75 | 1:3 | 8600 | 940,000 |

EXAMPLES 12-17

In Examples 12-17 the procedure of Examples 1-4 is repeated except that the organosilicon compound used in each example is varied. Table 4 lists the organosilicon compound used, the amount of the components employed and the flexural strength and modulus of the final molded products.

TABLE 4

| Example | Mica g. | TMSEBA g. | TMSEBA % | Silicon Compound g. | TMSEBA/ Silicon Compound | Flexural Strength psi | Modulus psi |
|---|---|---|---|---|---|---|---|
| 12 | 75 | 0.13 | 0.17 | 0.25$^a$ | 1:2 | 7600 | 800,000 |
| 13 | 75 | 0.13 | 0.17 | 0.25$^b$ | 1:2 | 7610 | 1,020,000 |
| 14 | 75 | 0.13 | 0.17 | 0.25$^c$ | 1:2 | 6410 | 919,000 |
| 15 | 75 | 0.13 | 0.17 | 0.25$^d$ | 1:2 | 7250 | 879,000 |
| 16 | 75 | 0.13 | 0.17 | 0.25$^e$ | 1:2 | 8560 | 1,130,000 |
| 17 | 75 | 0.13 | 0.17 | 0.25$^f$ | 1:2 | 7280 | 964,000 |

$^a$ethyl silicate
$^b$hexamethyldisiloxane
$^c$octyltriethoxysilane
$^d$tetrakis(2-ethylhexoxy)silane (alternatively called 2-ethylhexyl silicate)
$^e$tetrabutoxysilane (alternatively called butyl silicate)
$^f$octamethyltrisiloxane

EXAMPLES 18-20

In Examples 18-20 the procedure of Examples 1-4 is repeated except that 2-(trimethoxysilyl)ethylbenzene (TMSEB) is used as the organosilicon compound. The amounts of reagents employed and the physical properties of the compression molded plaques are recorded in Table 5.

TABLE 5

| Example | Mica g. | TMSEBA g. | TMSEBA % | TMSEB g. | TMSEBA/ TMSEB | Flexural Strength psi | Modulus psi |
|---|---|---|---|---|---|---|---|
| 18 | 120 | 0.40 | 0.33 | 0.80 | 1:2 | 7440 | 900,000 |
| 19 | 115 | 0.23 | 0.20 | 0.92 | 1:4 | 7700 | 970,000 |
| 20 | 100 | 0.10 | 0.10 | 0.90 | 1:9 | 6800 | 950,000 |

EXAMPLES 21-23

The physical properties of injection molded mica-filled polypropylene are determined. In Example 21, mica is treated with neither an azidosilane coupling agent nor an organosilicon compound. In Example 22 mica, pretreated with 0.5% trimethoxysilylethylbenzene sulfonylazide, (60 NP produced by Marietta Resources International, Canada) is used. The mica in Example 23 is treated with 0.25% TMSEBA and 0.75% 2-(trimethoxysilyl)ethylbenzene. In each example the solution of these materials in methylene chloride is applied using a twin shell blender and dried at room temperature. Polypropylene flake is tumbled with 40% by weight of the treated filler and dry blended in a high intensity mixer for about one minute. The mixture is melt compounded and pelletized using a counter-rotating twin-screw extruder with about 3 minutes hold-up time, barrel temperatures for Examples 21-23 of 165° C., 193° C. and 190° C., respectively, producing a melt temperature of about 190° C. The strands from the extruder are cooled in a water bath before cutting into pellets. Pellets are vacuum-dried for 3 hours at 100° C.

Test specimens are molded using a screw ram, 3 oz. 75-ton Newbury injection molding machine. The melt temperature is 215° C. and the mold held at 50° C. Injection pressure is 600-920 psi with 100 psi back pressure and a cycle time of 50 second. Dog-bone tensile bars 6.5"×0.50"×0.125" and straight bars 5.0"×0.50"×0.125" were molded. Physical tests for flexural and heat deflection tests were conducted under standard ASTM conditions: ASTM D638, D790, D256A and D648. The results are shown in Table 6.

TABLE 6

| Example | Composition | Tensile Strength psi | Elongation % | Tensile Modulus PSI 0.5% Secant | Tensile Modulus PSI 1.0% Secant | Flexural Modulus PSI 1% Secant RT | Flexural Modulus PSI 1% Secant 102° C. | Flexural Strength PSI RT | Flexural Strength PSI 102° C. | Heat Distortion Temp °C. 66 psi | Heat Distortion Temp °C. 265 psi |
|---|---|---|---|---|---|---|---|---|---|---|---|
| 21 | mica no treatment | 4100 | 2.8 | 684,000 | 381,000 | 641,000 | 194,000 | 8070 | 3090 | 125 | 69 |
| 22 | mica treated with TMSEBA | 4985 | 1.5 | 799,000 | 481,000 | 758,000 | 240,000 | 9160 | 3830 | 142 | 98 |
| 23 | mica treated TMSEBA and | 5400 | 1.5 | 858,000 | 525,000 | 801,000 | 258,000 | 9750 | 4180 | 144 | 104 |

TABLE 6-continued

| Example | Composition | Tensile Strength psi | Elongation % | Tensile Modulus PSI 0.5% Secant | Tensile Modulus PSI 1.0% Secant | Flexural Modulus PSI 1% Secant RT | Flexural Modulus PSI 1% Secant 102° C. | Flexural Strength PSI RT | Flexural Strength PSI 102° C. | Heat Distortion Temp °C. 66 psi | Heat Distortion Temp °C. 265 psi |
|---|---|---|---|---|---|---|---|---|---|---|---|
| | TMSEB | | | | | | | | | | |

EXAMPLES 24–27

In each example, a 0.25% solution of azidosilane coupling agent TMSEBA (with or without TMSEB) in methylene chloride is prepared. The amounts used are shown in Table 7. Two sheets of heat-cleaned woven glass cloth (7"×38") are dipped in the solution for ten minutes. The treated glass cloth is removed, hand-squeezed and hung to dry in air at room temperature overnight.

The coated glass cloth is cut into 5⅞"×5⅞" sheets. A sandwich beginning with two 6"×6" sheets polypropylene film, then alternating 6"×6" polypropylene film sheets with the coated glass cloth and ending with two 6"×6" polypropylene film sheets is prepared. The sheets of glass cloth are also alternated 90° to one another on the basis of the weave. A total of 15 polypropylene and 12 glass cloth sheets are used to form each sandwich.

The loose glass cloth sandwich is placed in a 6" square, 127 mil stainless steel picture frame and placed in a press preheated to 220° C. and closed using 80 psi air pressure. The contact pressure is raised to one ton and held for 5 minutes, then raised to 9 tons for 5 minutes. After cooling at 9 tons, the plaque is removed from the frame, trimmed, and sawed into 1"×3"×⅛" test pieces. Pieces are tested according to ASTM D790. The wet flexural strength is measured after the laminate is boiled in water for 72 hours.

The physical properties of the final laminates are listed in Table 7.

TABLE 7

| Example | TMSEBA % | TMSEB % | TMSEBA/TMSEB | Flexural Strength (psi) Dry | Flexural Strength (psi) Wet | Flexural Strength (psi) Retained | Modulus (psi) Dry | Modulus (psi) Wet | Modulus (psi) Retained |
|---|---|---|---|---|---|---|---|---|---|
| 24 | 0.12 | None | — | 37,000 | 27,000 | 73 | 2,240,000 | 2,200,000 | 98 |
| 25 | 0.06 | 0.06 | 1:1 | 38,000 | 33,000 | 87 | 2,300,000 | 2,110,000 | 92 |
| 26 | 0.04 | 0.08 | 1:2 | 37,000 | 33,000 | 89 | 2,220,000 | 2,130,000 | 97 |
| 27 | 0.03 | 0.10 | 1:33 | 36,000 | 31,000 | 86 | 2,100,000 | 2,100,000 | 100 |

EXAMPLES 28–34

In Examples 28–34, a variety of glass cloth/polypropylene laminates containing 70% glass are prepared using either no azidosilanes or an azidosilane admixed with either TMSEB or octyltrimethoxysilane. The procedure followed is that of Examples 24–27 except that instead of applying the coupling agent in solution, it is applied from an aqueous emulsion. The components applied, the amount of components applied, and the physical properties of the resulting laminates are shown in Table 8.

TABLE 8

| Example | TMSEBA % | Silicon Compound % | TMSEBA Silicon Compound | Flexural Strength, psi | Modulus, psi |
|---|---|---|---|---|---|
| 28 | 0.12 | — | — | 37,000 | 2,230,000 |
| 29 | — | 0.12[a] | — | 12,600 | 1,720,000 |
| 30 | 0.04 | 0.08[a] | 1:2 | 29,000 | 2,060,000 |
| 31 | 0.03 | 0.10[a] | 1:3.3 | 26,400 | 2,100,000 |
| 32 | 0.01 | 0.10[a] | 1:10 | 19,600 | 1,970,000 |
| 33 | — | 0.12[b] | — | 12,400 | 1,790,000 |
| 34 | 0.04 | 0.08[b] | 1:2 | 35,800 | 2,080,000 |

[a] TMSEB
[b] Octyltrimethoxysilane

EXAMPLES 35–39

In Examples 35–39 the procedure outlined in Examples 24–27 is followed except that ethyl silicate is used as the organosilicon compound. The amount of components used and physical properties of the laminates are outlined in Table 9.

TABLE 9

| Example | TMSEBA % | Ethyl Silicate % | TMSEBA/Ethyl Silicate | Flexural Strength, psi Dry | Flexural Strength, psi Wet | Modulus, PSI Dry | Modulus, PSI Wet |
|---|---|---|---|---|---|---|---|
| 35 | 0.03 | 0.10 | 1:3.3 | 30,000 | 27,000 | 2,040,000 | 2,020,000 |
| 36 | 0.03 | 0.09 | 1:3 | 31,000 | 29,600 | 2,170,000 | 2,090,000 |
| 37 | 0.04 | 0.08 | 1:2 | 33,000 | 26,000 | 2,040,000 | 2,060,000 |
| 38 | — | 0.12 | — | 12,600 | — | 1,900,000 | — |
| 39 | — | — | — | 11,400 | — | 1,900,000 | — |

What I claim and desire to protect by Letters Patent is:

1. In a process for adhering a polymer to a siliceous material by admixing the siliceous material, an azidosilane coupling agent and the polymer and then heating the admixture at a temperature and for a time sufficient to decompose the azide groups, the improvement of adding an organosilicon compound having the formula

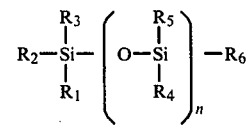

where n is an integer from 0 to 4 and $R_1$, $R_2$, $R_3$, $R_4$, $R_5$ and $R_6$, which may be the same or different, are selected from the group consisting of lower alkyl, aralkyl, or lower alkoxides to, and then admixing with, the admixture prior to decomposing the azide groups of the azidosilane coupling agent.

2. The process of claim 1 wherein the amount of azidosilane coupling agent in the admixture is from about 0.025% to about 1%, based on the weight of the siliceous material, and the amount of organosilicon compound in the admixture is from about 1 to about 5 times the amount of azidosilane used, based on the weight of the azidosilane.

3. The process of claim 1 wherein the organosilicon compound is ethyl silicate.

4. The process of claim 1 wherein the organosilicon compound is n-propyl silicate.

5. The process of claim 1 wherein the organisilicon compound is 2-(trimethoxysilyl)ethylbenzene.

6. The process of claim 1 where the siliceous material is chosen from the group consisting of mica and glass.

7. A polymer coated siliceous material formed by admixing the siliceous material, an azidosilane coupling agent, the polymer, and an organosilicon compound having the formula

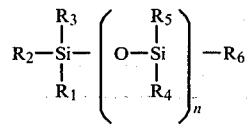

where n is an integer from 0 to 4 and where $R_1$, $R_2$, $R_3$, $R_4$, $R_5$ and $R_6$, which may be the same or different, are selected from the group consisting of lower alkyl, aralkyl, or lower akloxides and then heating the admixture at a temperature and for a time sufficient to decompose the azide group of the azidosilane coupling agent.

8. The polymer coated siliceous material of claim 7 wherein the organosilicon compound is ethyl silicate.

9. The polymer coated siliceous material of claim 7 wherein the organosilicon compound is n-propyl silicate.

10. The polymer coated siliceous material of claim 7 wherein the organosilicon compound is 2-(trimethoxysilyl)ethylbenzene.

* * * * *